(No Model.)

W. G. GALLOWAY.
DRYING KILN.

No. 532,418. Patented Jan. 8, 1895.

Witnesses:
Jas. H. Blackwood
David W. Gould

Inventor.
W. G. Galloway
By Wm. Hunter Myers,
Attorney.

THE NORRIS PETERS CO., PHOTO-LITHO., WASHINGTON, D. C.

UNITED STATES PATENT OFFICE.

WILLIAM G. GALLOWAY, OF CHICAGO, ILLINOIS.

DRYING-KILN.

SPECIFICATION forming part of Letters Patent No. 532,418, dated January 8, 1895.

Application filed May 31, 1894. Serial No. 513,028. (No model.)

*To all whom it may concern:*

Be it known that I, WILLIAM G. GALLOWAY, a citizen of the United States, residing at Chicago, in the county of Cook and State of Illinois, have invented certain new and useful Improvements in Drying-Kilns, of which the following is a specification, reference being had therein to the accompanying drawings.

My invention relates to improvements in down-draft drying-kilns, for drying brick, lumber, &c.; the object of the invention being to provide means whereby adequate central draft is produced without in the least interfering with the side drafts.

With the above object in view my invention consists in the details of construction and combination of parts hereinafter described, and then pointed out in the claims.

Figure 1:
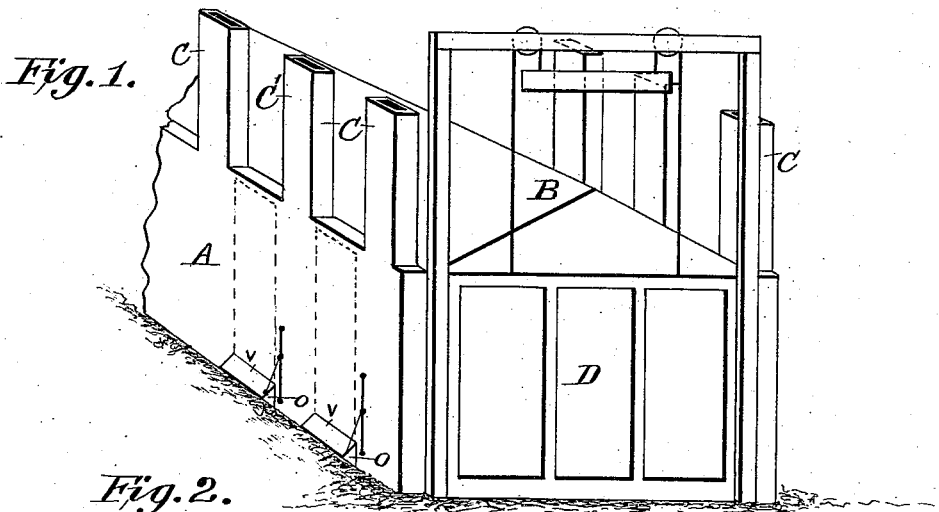
Figure 2:
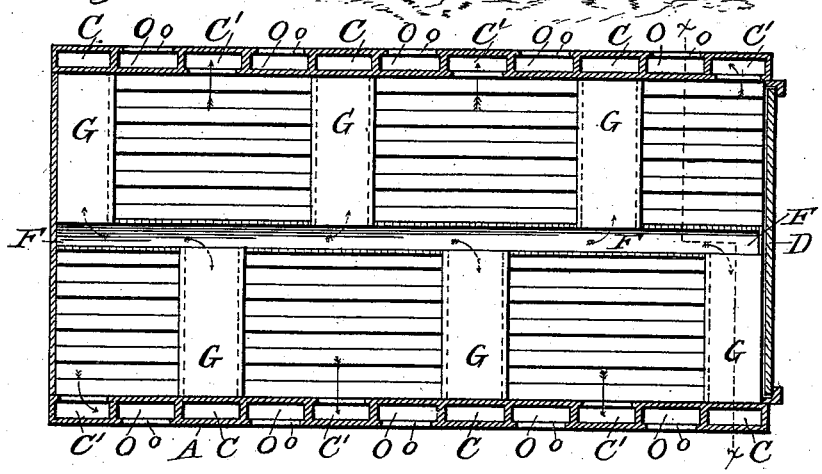
Figure 3:
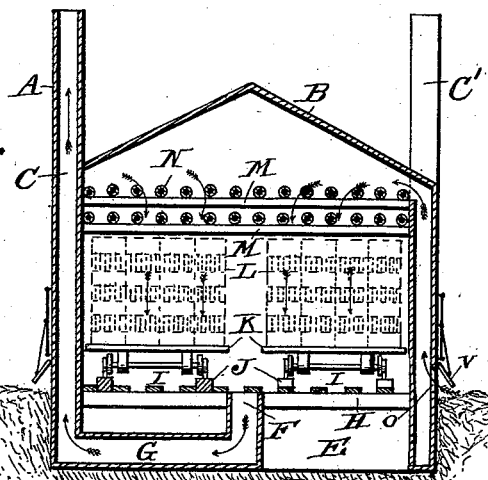

Figure 1 of the drawings is a broken perspective view showing the outlines of a kiln constructed in accordance with my invention. Fig. 2 is a horizontal section of the kiln taken on the floor line. Fig. 3 is a transverse vertical section of the kiln, showing the cars and steam-pipes in position, the section presumed to be taken on the line *x x*, Fig. 2.

Referring to the drawings, A represents the side walls of the kiln; B, the closed roof; C C', two series of chimneys built in the side walls and rising above them; and D one of the vertically-sliding end doors.

E represents an excavation in the ground, which is of the full length and width of the kiln and about thirty inches deep. In the longitudinal center of this excavation is a walled channel F, from which on each side at suitable intervals and in staggered order extend lateral walled and covered ducts G.

Across the top of the excavation E are laid joists H, on which is laid a slatted floor I, the slats being laid a suitable distance apart, as shown in Figs. 2 and 3. On the joists are also laid one or more car-tracks J, on which move cars K carrying the brick or lumber to be dried.

Across the upper portion of the drying-compartment are stringers M, which support a system of steam-pipes N, as shown in Fig. 3, which pipes are arranged to receive live steam from any suitable source. It is evident, however, that the steam-pipes are not necessarily located in the upper portion of the chamber, as they might with good effect be located anywhere in the path of travel of the ingoing air, as, for instance, within or on the side walls of the kiln above the air-inlets.

It will be observed on reference to the drawings that in the side walls, intermediate the chimneys, I form air-flues O, having in the outer side inlets *o*, adapted to be closed by valves *v*. These flues, as will be seen in the drawings, take the air in near the ground line and deliver it to the upper portion of the kiln, over the steam-pipes. These flues are not in communication with the space under the floor; but in Fig. 2 it will be seen that the chimneys C' are in open communication with said space, while the chimneys C are in open communication, through the ducts G, with the channel.

In operation, assuming that the air-inlet valves are open, the air will pass upward to and over the steam-pipes, and will then circulate downward through the slatted floor into the open space and channel beneath. As the series of chimneys C communicate with the channel a central current will be set up, while the chimneys C', which communicate with the open space on each side of the channel, will cause free circulation of the heated air in those portions. It will thus be seen that I have effective provision for complete down-draft circulation of air throughout the entire area of the drying-compartment. By arranging the chimneys of one series on one side of the channel in staggered relation to the chimneys of the same series on the opposite side, and causing one series to draw from the channel and the other from the open space in the excavation outside of the channel, it will be evident that the air in its descent will be compelled to traverse every portion of the compartment to a practically even extent.

Having thus described my invention, what I claim as new, and desire to secure by Letters Patent, is—

1. A drying-kiln having an open floor, an excavation longitudinally beneath the floor, a longitudinal walled channel in the excavation, a series of air-flues in the side walls of the kiln adapted to admit air from the outside and conduct it to the upper part of the drying-compartment, an air-heating apparatus located in the path of the ingoing air, one series of chimneys in communication with the channel, and another series of chimneys in communication with the excavation outside of the channel, the chimneys of one series on one side of the kiln being in staggered relation to those of the same series on the other side of the kiln.

2. A drying-kiln having an open floor, an excavation longitudinally beneath the floor, a central longitudinal walled channel in the excavation, steam-pipes in the upper portion of the drying-compartment, a series of air-flues in the side walls of the kiln adapted to admit air from the outside near the ground line and conduct it to the steam-pipes, one series of chimneys in communication with said channel, and another series of chimneys in communication with the excavation outside of the channel, the chimneys of one series on one side of the kiln being in staggered relation to those of the same series on the other side of the kiln.

In testimony whereof I affix my signature in presence of two witnesses.

WILLIAM G. GALLOWAY.

Witnesses:
J. PRAUL RUE,
H. E. RISLY.